United States Patent [19]

Sakuragi et al.

[11] Patent Number: 5,032,819
[45] Date of Patent: Jul. 16, 1991

[54] DATA COMMUNICATIONS SYSTEM

[75] Inventors: Satoshi Sakuragi; Takashi Kuroda, both of Yokohama; Takeshi Ikeda, Sagamihara, all of Japan

[73] Assignee: Murata Mfg. Co., Ltd., Japan

[21] Appl. No.: 422,658

[22] Filed: Oct. 17, 1989

[30] Foreign Application Priority Data

Oct. 24, 1988 [JP] Japan ................... 63-267658
Oct. 11, 1989 [JP] Japan ................... 1-265516

[51] Int. Cl.$^5$ ........................... H04M 11/04
[52] U.S. Cl. ..................... 340/310 A; 340/310 R; 375/8; 379/98; 379/413
[58] Field of Search ............ 340/310 R, 310 A; 375/8; 379/98, 97, 413

[56] References Cited

U.S. PATENT DOCUMENTS

| 4,373,117 | 2/1983 | Pierce | 375/8 |
| 4,395,590 | 7/1983 | Pierce et al. | 375/8 |
| 4,415,774 | 11/1983 | Driver | 379/98 |
| 4,578,533 | 3/1986 | Pierce | 375/8 |
| 4,592,069 | 5/1986 | Redding | 379/98 |

Primary Examiner—Donnie L. Crosland
Attorney, Agent, or Firm—Oliff & Berridge

[57] ABSTRACT

A data communications system includes a high impedance input circuit, which serves as an input circuit linking between a communications interface and a data terminal equipment, and a power supply circuit which obtains a receiving signal from an input terminal of the high impedance input circuit and draws electric power from the receiving signal to supply to the data communications system.

20 Claims, 5 Drawing Sheets

DATA COMMUNICATIONS SYSTEM

BACKGROUND OF THE INVENTION

1. Field of the Invention

The present invention relates to an unit which is provided with a communications interface circuit, such as RS 232C, more particularly to an improvement of a data communications system comprising a data terminal equipment (hereinafter simply referred as DTE) and a data communications equipment (hereinafter simply referred as DCE), that is, a modem.

2. Description of the Prior Art

In recent years, data communication, in which data is received or sent among data terminal equipments (hereinafter referred to DTE) over telephone lines, has rapidly prevailed throughout the world.

With the development of this data communication, a communications interface has been normalized in order to establish a standardization of a data transmission control among DTEs. For example, RS 232C interface was standardized by EIA (Electronics Industries Association) as an interface to link between a DTE and a modem. Since then, RS 232C interface has been put into practice as the international standard.

Accordingly, the standardized interface circuit allowed an independent DTE to link with another DTE, realizing the data communication.

However, in the conventional communications interface, such as RS 232C interface, a load output from the driver circuit is specified to be from 5 V to 15 V as shown in Table 1.

This means that the driver circuit of each communications interface transmits a signal with a relatively large amount of electric power taking into account that an input signal should be secured at the receiver circuit maintaining the specified voltage even when the signal is transmitted through a cable with a maximum length. For example, in the case of RS 232C interface, a voltage ranging from 5 V to 15 V is to be secured at the receiver after the signal passed through the cable of 15 meters.

Moreover, in the conventional technique, a data communications system, with which a communications interface circuit to realize a data communication is provided, is driven by its dedicated power supply circuit.

TABLE 1

| Specifications of RS 232 C | |
|---|---|
| Operation | Unbalanced |
| Power Supply Voltage | ±12 V |
| Driver Circuit | |
| Maximum cable extension | 15 m |
| Maximum data rate | 10 kBaud |
| No-load output voltage | $\leq 25$ V |
| Load output voltage | 5~15 V |
| Output resistance value when power is off. | $\geq 300\ \Omega$ |
| Output current value when a circuit is shorted. | $\leq 500$ mA |
| Through output rate | $\leq 30$ V/$\mu$S |
| Receiver Circuit | |
| Input resistance | 3 k ~ 7 k$\Omega$ |
| Threshold | $-3 \sim +3$ V |
| Maximum input voltage | ±25 V |

As has been described above, there has been a problem that the independent power supply is necessary for the driver, for example, the DTE and the receiver circuit, such as the DCE, respectively in the conventional data communications system, which a communications interface circuit is built in. Therefore, the communication system was hard to be miniaturized.

Another fact is that power has been wastefully dissipated in the receiver circuit of the DCE because the DCE, which the communications interface circuit is provided with, has usually been arranged in proximity to the DTE, such as a personal computer, linking them with a short cable, so that the signal loss can result only in small amount.

SUMMARY OF THE INVENTION

The object of this invention is to provide a method of decreasing the size of a data communications system and increasing the efficiency of supply power, for example, when using a short cable to link between a data communication equipment and a data terminal equipment or when both the DCE and DTE are directly linked together with a connector by employing a new circuit configuration which utilizes the electric power of an input signal transmitted through the cable as power of the DCE.

To achieve the above object, this invention consists of:

a high impedance input circuit with a predetermined input impedance which receives an input signal from the DTE through a communication cable, a power supply circuit which obtains the input signal from an input terminal of the high impedance input circuit and draws power from the input signal to supply to the DCE.

Employing these circuit configurations allows power to be furnished to the DCE by utilizing the electric power of the input signal, and also enables the miniaturization and efficiency improvement of the data communication system.

That is, when a signal is transmitted from another unit, for example, such as DTE, through a communication cable, this signal is received at a high impedance input circuit. At this time, the signal which is branched from an input terminal of the high impedance input circuit is delivered to a power supply circuit. In the power supply circuit, power is drawn from the input signal, and then this electric power is delivered to the DCE. Therefore, the present invention can achieve the aforementioned effects of the power supply system, the miniaturization of the DCE and the improvement of efficiency.

The impedance input circuit may be replaced by a circuit configuration comprising:

a clamp circuit which puts a clamp on the input signal with its predetermined impedance; and a level conversion inverter which converts the signal obtained from the clamp circuit into another signal with a specified voltage level and then produces an output of the converted signal.

In addition, the clamp circuit configuration can comprise:

a resistor which limits a power of the receiving signal; and a clamp diode which clamps the input signal and supplies the clamped signal to the level conversion inverter.

The power supply circuit may also be rearranged to the circuit configuration which involves a plurality of rectifiers to commutate the input signal and a DC-DC converter to convert the rectified signal to a signal with a predetermined voltage.

Furthermore, this DC-DC converter can be modified to a self-exciting type converter comprising a self-exciting oscillator, a transformer and a rectifier output block which produces two output voltages, that is, a positive output voltage and a negative output voltage.

Besides, a differential circuit can be used in the self-exciting oscillator so as to limit an input current transmitted to the transformer. If the differential circuit is employed, the power furnished to the DCE can be limited within a desired range. The differential circuit may be comprised of a differential amplifier circuit which includes, for example, such as operational amplifier.

If a communication cable is provided with a plurality of signal receiving lines, the corresponding number of the high impedance input circuits and that of power supply circuit can be connected to the DCE and a plurality of input signals are drawn from input terminals of the impedance input circuits. In such a case, it is possible to establish a power output block in the DCE to sum up every output produced by all the power supply circuits. This output block can be replaced by a node to add up each output produced by the power supply circuits.

If RS 232C interface circuit is used for a communications interface circuit in the DCE of the present invention, or the data communications system, then the DCE will become the system that complies with the RS 232C interface standard.

BRIEF DESCRIPTION OF THE ACCOMPANYING DRAWINGS

Figure 5:
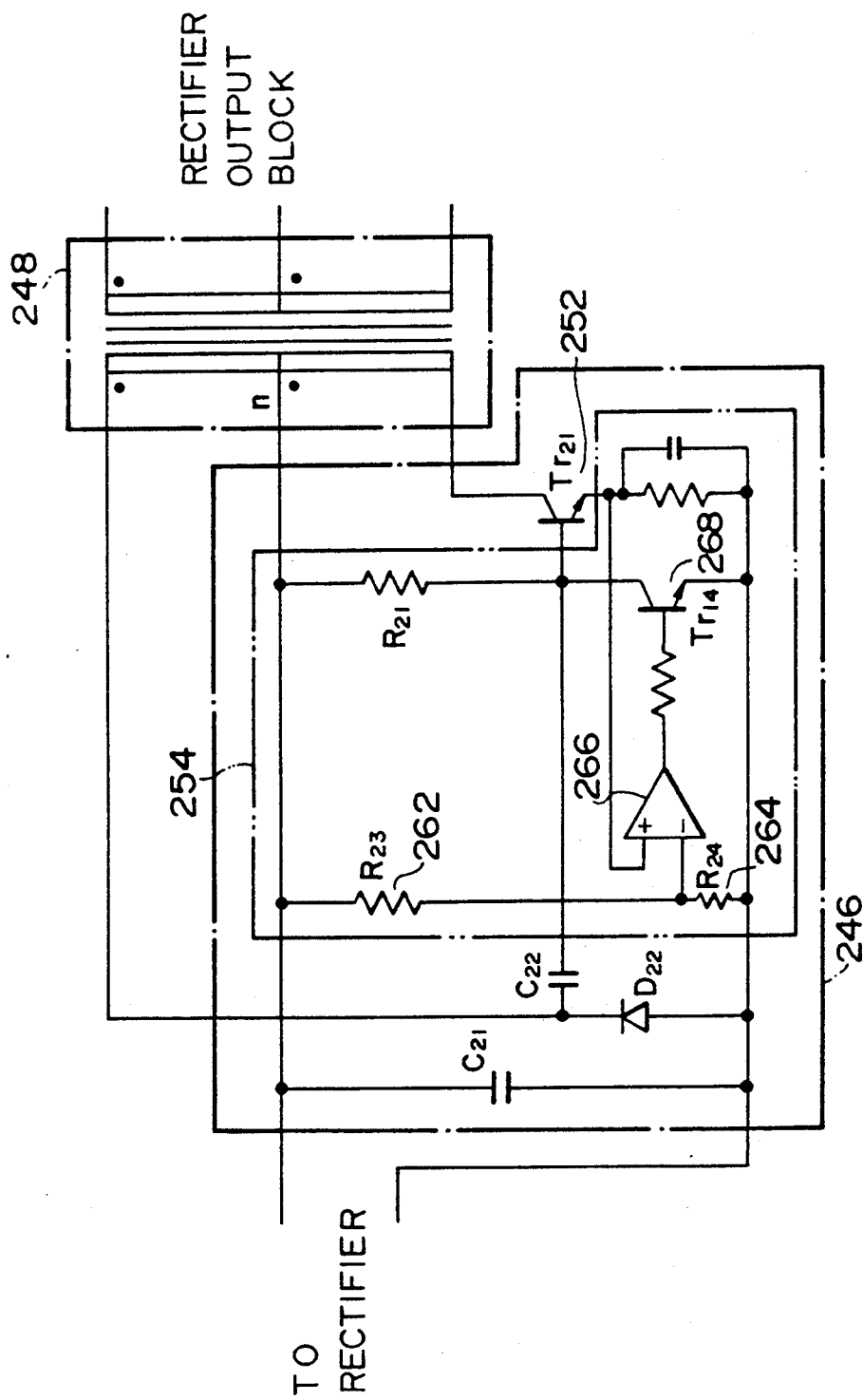

FIG. 5 is a schematic diagram denoting a circuit configuration of self-exciting oscillator 246 consisting of differential circuit 254 which includes operational amplifier 266.

DETAILED DESCRIPTION OF THE PREFERRED EMBODIMENTS OF THE INVENTION

The foregoing and other objects, features and advantages of the invention will be apparent from the following more particular description of preferred embodiments of the invention, as illustrated in the accompanying drawings.

Figure 1:
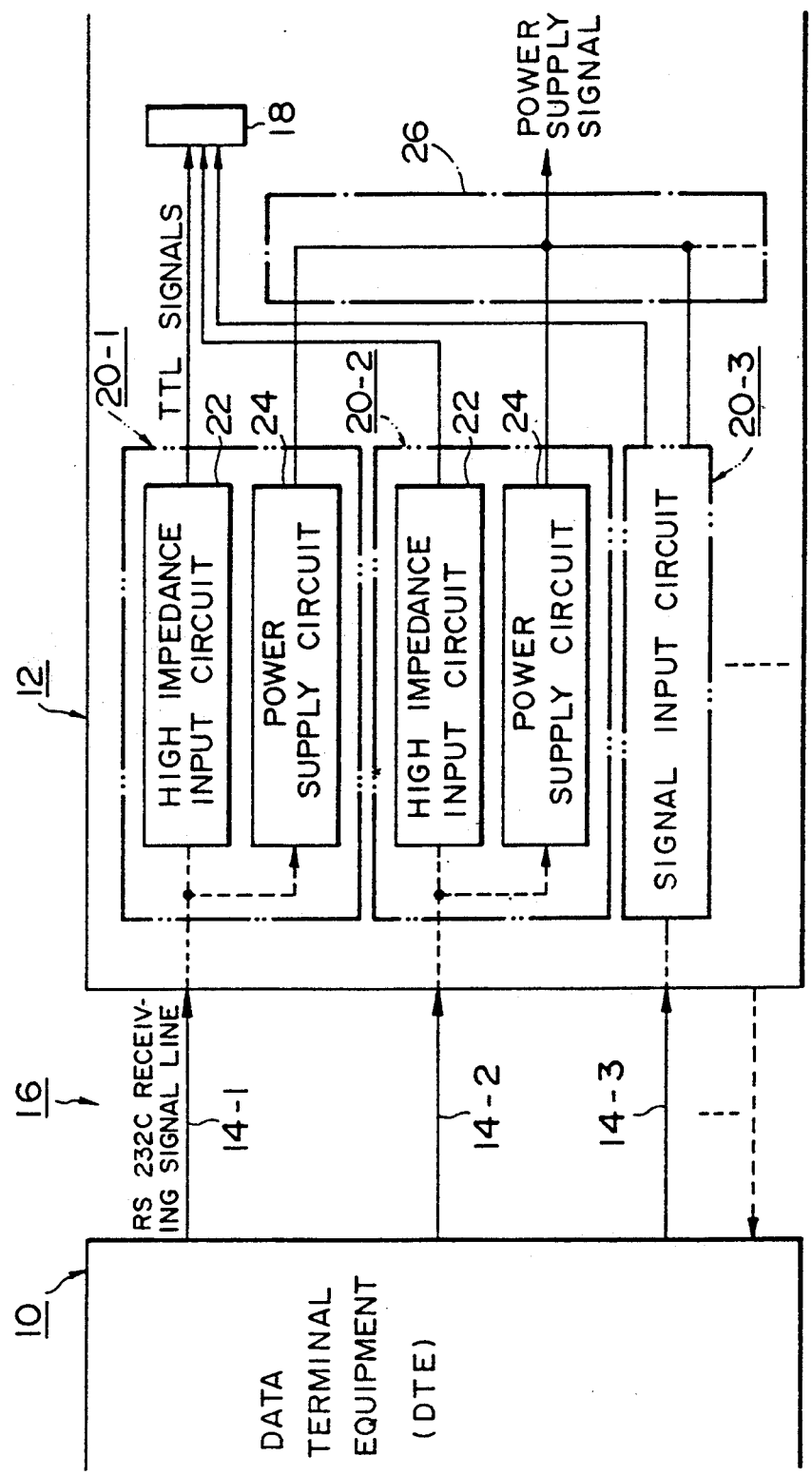
FIG. 1 is a schematic diagram showing a configuration of a data communication system which comprises a data communications system. In this illustration, high impedance input circuit 22 and power supply circuit 24 featuring the present invention are illustrated.

FIG. 1 is an overview of a data communications system. In FIG. 1, data communication is practiced between a driver circuit, that is, data terminal equipment (DTE) 10, and a receiver circuit, or data communications equipment (DCE) 12 in a communications interface, such as, RS 232C. The DTE 10 and DCE 12 are linked together by a communication cable comprising RS 232C signal receiving lines identified with numerals of 14-1, 14-2 and 14-3 .... DCE 12, which contains RS 232C interface circuit 18, comprises a plurality of signal input circuits with numerals of 20-1, 20-2 and 20-3 ....

In the present invention, each of the signal input circuits 20-1, 20-2 and 20-3 ..., is constituted of high impedance input circuit 22 and power supply circuit 24 connecting them in parallel. With this circuit configuration, input signals are sent to the RS 232C interface in the form of TTL signals with a microelectric power by way of the high impedance input circuit 22, while the remaining electric power of the input signals obtained through communication cable 16 is transmitted to power supply circuit 24, where power is drawn from the input signals as the power signal. Every power signal produced by the power supply circuits 24 are summed up at power output block 26, which consists of a node, and then the combined power source is furnished to DCE 12 as a drive power.

In the conventional standard, according to the RS 232C interface standard, power is supplied to a signal input circuit considering a power loss which would be generated on the way of transmitting in a cable which extends more than 10 meters. Generally, most of this large amount of power has been wasted when a short cable is used. The present invention enables to utilize the wasted electric power to power the DCE 12 efficiently.

In addition, in this embodiment, even if RS 232C interface signal is input with variations, a stable power can be furnished to the DCE 12 because this supply-voltage is obtained by summing up and arranging every output produced by the power supply circuits 24 at the power output block 26.

Figure 2:
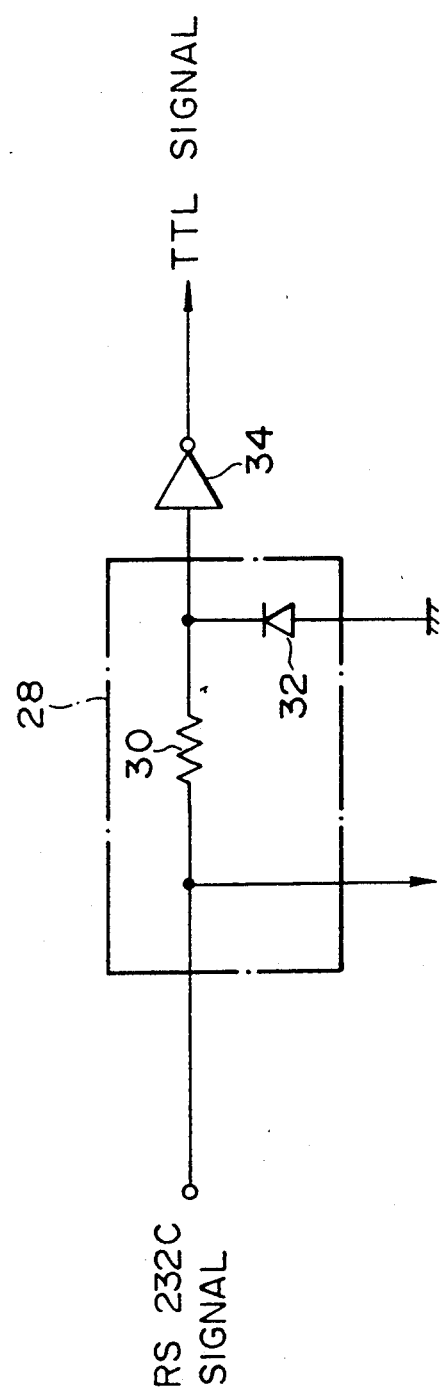
FIG. 2 is a schematic diagram representing a circuit configuration of the high impedance input circuit 22 shown in FIG. 1.

The circuit configuration of the high impedance input circuit 22 of the present invention is represented in FIG. 2. As the figure shows, the clamp circuit 28 of the high impedance input circuit is constituted with a configuration in which resistor 30 is connected in series with clamp diode 32 and also level conversion inverter 34 is connected to the junction of series connection.

The impedance of the resistor 30 is predetermined to by high enough to restrict the amount of power which is dissipated in the RS 232C interface input signal to a small amount. Also, the clamp diode 32 in the clamp circuit is used to cut off the reverse voltage. In addition, the level conversion inverter 34 is utilized to convert an input voltage to the voltage level which the DCE 12 requires.

In case a Zener diode is used instead of the clamp diode 32, the level conversion inverter 34 can be replaced by a LSTTL or a CMOS inverter.

For example, when ±12 V receiving signal enters the clamp circuit 28 of the high impedance input circuit, the signal is then converted into a signal with the voltage ranging from 0 to 12 V. Before long, the converted signal is sent to the level conversion inverter 34, where the signal is converted into a voltage level ranging from 0 to 5 V, and then the signal is output from the inverter 34 in the form of TTL signal that is the appropriate form to be processed in an arbitrary manner by RS 232C interface circuit 18.

Figure 3:
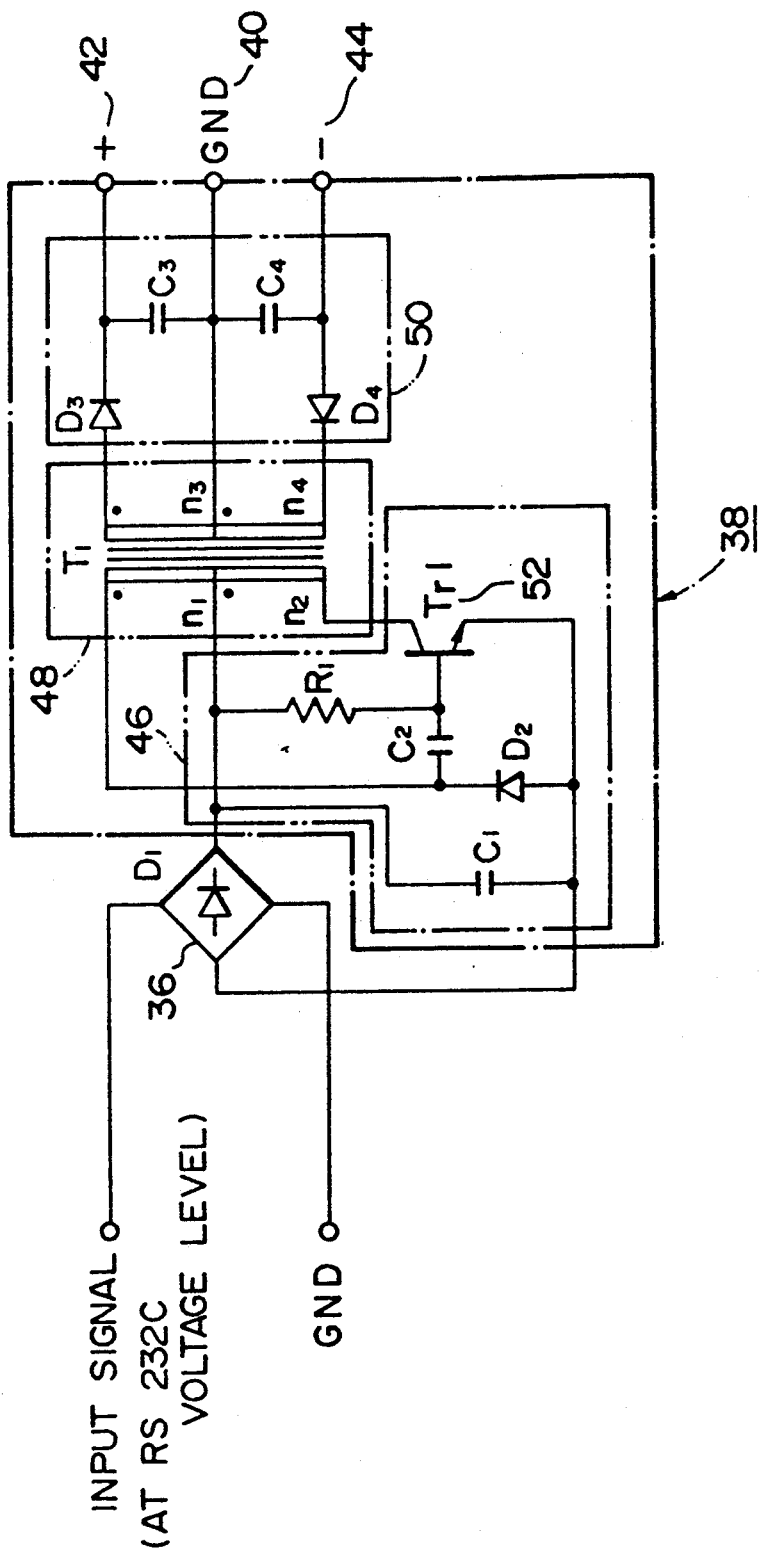
FIG. 3 is a schematic diagram depicting a circuit configuration of the power supply circuit 24 illustrated in FIG. 1.

FIG. 3 represents a circuit configuration of the power supply circuit 24 in this embodiment. In FIG. 3, the power supply circuit 24 consists of the rectifier 36 and the DC-DC converter circuit 38.

As is generally known, the RS 232C interface standard requires a form of digital signal for its input, therefore, the power supply circuit 24 comprises the rectifier 36 at its input stage so as to convert the digital signal into a direct current signal. This rectifier is constituted as the full-wave rectifier type as shown in FIG. 3.

DC-DC converter circuit 38 is so-called a self-exciting converter. This converter circuit 38 is provided with GND terminal 40, positive output terminal 42 and negative output terminal 44 as the output terminals.

Since the self-exciting converter is a generally-known circuit, the detailed explanation for it is omitted in the specification. Only a brief explanation with respect to the construction and function of the self-exciting converter in this embodiment will be described below.

The DC-DC converter circuit 38 in this embodiment is comprised of self-exciting oscillator 46, transformer 48 and rectifier output block 50. The self-exciting oscillator 46 includes transistor 52 whose base is connected to the anode of the rectifier 36 through resistor R 1 and whose emitter is connected to the cathode of the same rectifier 36. The collector of the transistor 52 is connected to the anode of the rectifier 36 through the primary winding n 2 of the transformer 48. Moreover, the transformer 48 is provided with a primary winding n 1, which is wound in series with the primary winding n 2 with same polarity. The one end of the primary winding n 1 is connected to the cathode of diode D 2 whose anode is connected to the cathode of the rectifier 36. The other end of the primary winding n 1 is connected to the base of the transistor 52 through capacitor C 2. The anode and cathode of the rectifier 36 is connected across capacitor C 1.

The self-exciting type converter 38 in this embodiment is composed of the self-exciting oscillator 46 with the above mentioned circuit configuration. A brief explanation of the self-exciting oscillator 46 follows. When a signal voltage from the DTE is applied to the rectifier 36, a base current is supplied to the transistor 52 by way of the resistor R 1. With the base current being furnished, the transistor 52 enters "on" status, and then the transistor 52 supplies the collector current to the primary winding of n 2.

Concurrently, a charging current is furnished from the anode of the rectifier 36 to the primary winding of n 1 through the capacitor C 2. This charging current acts to increase the conductivity of the transistor 56, so that the collector current of the transistor 52 can increase.

The current passed through the primary winding n 1 is instantly discharged from the capacitor C 2 because of its small capacitance value. With this result, the base current of the transistor 52 cannot increase in proportion to the increment of the collector current of the transistor. The correlation of the base current and the collector current will be represented as follows:

$$I_C > I_B * hfe \quad (1)$$

where hfe is current amplification coefficient of transistor 52.

As depicted in the above equation, the transistor 52 instantly enters "off" when the amount of the collector current exceeds the amount of current that is obtained by multiplying the amount of base current by the current amplification factor.

During off status, the electromagnetic energy, which is stored in the capacitor C1 while the transistor 52 was in "on" status, flows from the primary winding n 1 to the capacitor C 1. This discharge results in applying a negative voltage to the capacitor C2, so that the transistor 52 can be adversely biased to maintain "off" status.

After the discharge of electromagnetic energy from the diode D2 is completed, a base current is again supplied to the transistor 52 through the resistor R 1, and then the circuit continues self-excitation.

Accordingly, the excitation frequency, that is, the self-excitation frequency, of the self-exciting oscillator 46 is determined by the circuit constant and load of the oscillator.

The feature of the self-exciting oscillator 46 is in that the corresponding signal output circuit of the DTE 10 can be protected by specifying the bias constant C2 and R1 of this self-exciting oscillator 46. In other words, this constant C2 and R1 is determined so that the maximum input current $I_{max}$ applied to the power supply circuit 24 may satisfy the following equation.

$$I_{max} = \text{Input Signal Voltage/Load Impedance} \quad (2)$$

When the circuit is arranged to conform to the above equation, the input current saturates at the level of $I_{max}$ because the base current will be in short supply by the bias constant C2 and R1 when the load needs a large amount of current.

Because of the aforementioned self-exciting oscillation, a current flows with the reverse direction in the secondary winding coils n3 and n4, and this current is then stored in the capacitors C3 and C4 by way of diodes D3 and D4.

Consequently, the voltage level which corresponds to the turn ratio of the primary winding and the secondary winding is obtained at the respective output terminals 42 and 44 with the opposite polarity when comparing to the reference voltage of the GND terminal 40.

As has been described above, according to the DC-DC converter circuit 38 employed in this embodiment, power can be obtained in the range from 5 V to 10 V from RS 232 C interface signal of ±12 V.

Furthermore, in this embodiment, every output produced at predetermined circuits of the power supply circuits 24 are added up at the power output block 26. Therefore, a full power is secured as a whole because the bias constant C 2 and R 1 is predetermined as has been described above, so that the operation of each of the converters can be sequentially restricted by the current saturation when each input current reaches its maximum.

Figure 4:
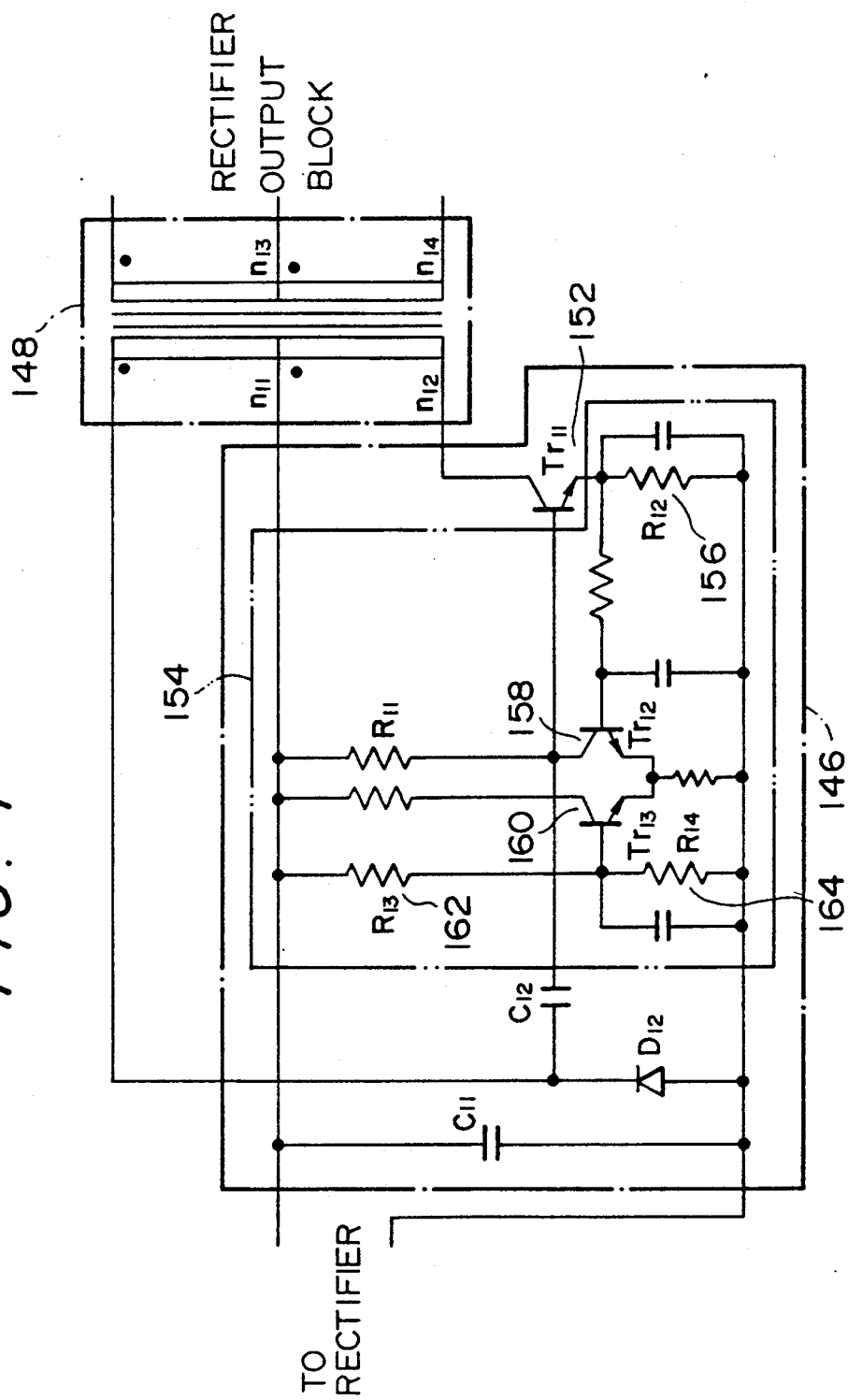
FIG. 4 is a schematic diagram representing a circuit configuration of the self-exciting oscillator 146 comprising differential circuit 154.

FIG. 4 shows a circuit configuration of self-exciting oscillator 146 which is employed in the second embodiment of the data communications system. This self-exciting oscillator 146 comprises differential circuit 154 which restricts a current supplied to the primary winding n 12 of transformer 148 under the control of transistor 152. Taking into account the difference between the self-exciting oscillators 46 and 146, the operation of the self-exciting oscillator 146 is now explained in the following.

According to FIG. 4, transistor 158 enters "on" status when the collector current Ic of the transistor 152 satisfies the equation below;

$$Ic * R12 > Vbe(Tr12) \quad (3)$$

where R12 represents a resistance value of resistor 156 and Vbe (Tr12) denotes a base voltage of the transistor 158, with the result that, the base current of the transistor 152 is restricted and the input current to the primary winding n 12 of the transformer 148 is limited in consequence.

On the other hand, the base potential of transistor 160, which is connected differentially to the transistor 158, is determined by resistors 162 and 164. In the steady condition, the transistor 158 is held "off" and the transistor 160 is maintained in "on" in consequence. With these conditions, if the base potential of the transistor 158 exceeds that of the transistor 160, the transistor 158 will enter "on", resulting in restricting the base current of the transistor 152. Then, the base current of the transistor 158 decreases and the transistor 160 enters "on". The repetition of this chain of operation results in increasing the base current of the transistor 152 up to its allowable maximum value.

Therefore, the restriction values of the input current to the transformer 148, that is, the input limitation current, is determined in proportion to the input voltage to the self-exciting oscillator 146. If the excitation current of the transformer 148 is set to be free from any restriction, the input current Iin to the transformer 148 will be defined as;

$$Iin = (n13/n12)Io + (n14/n12)Io(-) \quad (4),$$

where Io denotes a positive output current from the transformer 148 and Io(−) depicts a negative output current from the transformer 148.

Therefore, according to this embodiment, the DCE can constantly secure the maximum power because the input limitation current can be set so as to be proportional to the voltage of the RS 232C signal, that is, the output voltage of the rectifier.

In case a plurality of power supply circuits are provided to the DCE and also a power output block is arranged to supply power to the DCE after adding up every output produced at predetermined circuits of all power supply circuits, it will be possible to supply power without exceeding the allowable maximum current of the DCE.

FIG. 5 illustrates a circuit configuration of self-exciting oscillator 246 in the third embodiment of the present invention. This oscillator 246 shown in this figure includes differential circuit 254 comprising operational amplifier 266.

In this embodiment, the emitter potential of transistor 252 and the potential divided by transistors 262 and 264 are compared at operational amplifier 266 instead of comparing between the base potential of the transistor 158 and that of the transistor 160 in FIG. 4.

The base potential of transistor 268, in other words, the base potential of transistor 252 can be determined based on the output current from the operational amplifier 266. Accordingly, as the same manner in FIG. 4, it becomes possible to set the input limitation current, and the same effects as shown in FIG. 4 can be secured.

In the preferred embodiments, though the example, which employs the RS 232C as the interface standard, has been described, the same effect will surely be achieved when applying the present invention to the data communications system, which employs an interface circuits complying with other standards, such as RS 422 etc. .

As has been described above, according to the present invention, the miniaturization and the efficiency improvement of the data communication system are achieved because the voltage level of the signal, which is transmitted through the communication interface, is furnished to the DCE of the communications interface, saving one of the power supply circuits equipped to both DTE and DCE in the conventional system when linking them with a short cable or when connecting them directly with a connector.

What is claimed is:

1. A data communications system in which a communications interface circuit is provided with and receives a signal from another apparatus comprising:

a high impedance input circuit, whose impedance is predetermined, receiving an input signal from said another apparatus with its specified input impedance; and a power supply circuit which obtains said input signal from an input terminal of said high impedance input circuit and draws electric power from said input signal to supply power to said data communications system, whereby said input signal is also used as a drive power source to said data communications system.

2. A data communications system according to claim 1, wherein said high impedance input circuit comprising:

a clamp circuit, whose impedance is predetermined, puts a clamp on said input signal; and a level conversion inverter, which converts said signal obtained from said clamp circuit into a signal with a predetermined level and produces an output of the converted signal.

3. A data communications system according to claim 2, wherein said clamp circuit comprises:

a resistor which restricts the power of said input signal; and a clamp diode which performs a clamp on said receiving signal output from said resistor, whose power is restricted with said resistor, and supplies the clamped signal to said level conversion inverter.

4. A data communications system according to claim 1, wherein said power supply circuit comprises:

a rectifier which commutates the input signal obtained from the input terminal of said high impedance input circuit; and a DC-DC converter which converts an output voltage produced by said rectifier into a DC voltage with another value.

5. A data communications system according to claim 4, wherein said rectifier is a full-wave rectifier which executes a full-wave-rectification of the receiving signal obtained from the input terminal of said high impedance input circuit.

6. A data communications system according to claim 4, wherein said DC-DC converter is a self-exciting converter comprising a self-exciting oscillator which operates a self-exciting oscillation with a frequency determined by a circuit constant and a load of said DC-DC converter circuit;

a transformer which transforms an output oscillation produced by said self-exciting oscillator; and a rectification output block which commutates the output from said transformer and then feeds the commutated current out.

7. A data communications system according to claim 6, wherein said self-exciting oscillator comprises a differential circuit which confines input current transmitted to said transformer within a specified range of current value.

8. A data communications system according to claim 7, wherein said differential circuit contains a differential amplifier.

9. A data communications system according to claim 6, wherein said rectification output block produces two output voltages, that is, a positive output voltage and a negative output voltage.

10. A data communications system according to claim 7, wherein said rectifier output block produces two output voltages, that is, a positive output voltage and a negative output voltage.

11. A data communications system according to claim 8, wherein said rectifier output block produces two output voltages, that is, a positive output voltage and a negative output voltage.

12. A data communications system in which a communications interface circuit is equipped with and receives a signal from another apparatus via a plurality of signal receiving lines, comprising:
   a plurality of high impedance input circuits, whose impedance is predetermined, receiving an input signal through said signal receiving line with their predetermined input impedance; and
   a plurality of power supply circuits which obtain said input signals from input terminals of said plurality of high impedance input circuits and draw electric power from said input signals;
   an electric power output block which combines every output produced by said power supply circuits and supplies the combined electric power to said data communications system, whereby said input signals are also used as a drive power source to be supplied to said data communications system.

13. A data communications system according to claim 12, wherein said electric power output block comprises a node connecting output terminals of all said electric power supply circuits.

14. A data communications system according to claim 12, wherein said communications interface circuit represents a RS 232C interface circuit.

15. A data communications system according to claim 13, wherein said communications interface circuit is said RS 232C interface circuit.

16. A data communications system according to claim 12, wherein said high impedance input circuits further comprise:
   clamp circuits, whose impedance is predetermined, for clamping said input signals; and
   level conversion inverters which convert the signals obtained from said clamp circuits to a predetermined level and produce outputs of these converted signals.

17. A data communications system according to claim 12, wherein said power supply circuits including:
   rectifiers which commutate the input signals obtained from the input terminals of said plurality of high impedance input circuits;
   DC-DC converters which convert output voltages from said rectifiers into a DC voltage with another value.

18. A data communications system in which the RS 232C interface circuit is provided with and receives signals from another apparatus via a signal receiving line incorporating a plurality of lines comprising:
   a plurality of high impedance input circuits, whose impedance are predetermined, receiving input signals through said signal receiving lines with their predetermined input impedance; and
   a plurality of power supply circuits, which obtain said input signals from said input terminals of said plurality of high impedance input circuits and draw electric power from said input signals to supply power to said data communications system, whereby said input signals are also used as a drive power source to be supplied to said data communications system, wherein said high impedance input circuits comprise:
   (1) clamp circuits incorporating resistors which restrict the power of said input signals and the power of said clamp circuits putting a clamp on signals sent from said resistors and producing output of them;
   (2) level conversion inverters which convert signals obtained from said clamp circuits to a predetermined level and produce the output of the converted signals; and also said power supply circuits comprise;
   (1) rectifiers which produce said full-wave-rectification of the signals obtained from said input terminals of said plurality of high impedance input circuits; and
   (2) DC-DC converters, that is, self-exciting converters comprising:
   self-exciting oscillators which perform a self-excitation with a predetermined frequency determined by a circuit constant and a load;
   transformers which transform oscillation output produced by said self-exciting oscillators;
   rectification output blocks which produce output by rectifying the output from said transformers.

19. A data communications system according to claim 18, wherein said self-exciting oscillators include differential circuits which confine currents transmitted to said transformers within a specified range of current value.

20. A data communications system according to claim 19, wherein said differential circuits include differential amplifiers.

* * * * *